United States Patent [19]

Kawano et al.

[11] Patent Number: 4,849,963
[45] Date of Patent: Jul. 18, 1989

[54] CELLULAR RADIO TELEPHONE ENHANCEMENT CIRCUIT

[76] Inventors: Minori Kawano, Astronet Corporation, 400 Reinhert Rd., Lake Mary, Fla. 32746; Tomoji Ichinose, A2-204 3-6 Shinsenri-Minamimachi, Toyonaka, Osaka, Japan; James G. Ferguson, P.O. Box 717, Fruitland Park, Fla. 32731

[21] Appl. No.: 787,332
[22] Filed: Oct. 15, 1985
[51] Int. Cl.⁴ .............................................. H04B 1/50
[52] U.S. Cl. ........................................ 370/30; 455/15
[58] Field of Search ....................... 370/30, 31, 26, 75; 455/33, 9, 55, 53, 251, 17, 54, 56, 340, 15, 20; 379/59

[56] References Cited

U.S. PATENT DOCUMENTS

| | | | |
|---|---|---|---|
| 3,450,841 | 6/1969 | Zeiser et al. | 370/75 |
| 4,150,334 | 4/1979 | Williams | 455/20 |
| 4,198,600 | 4/1980 | Oguchi et al. | 455/15 |
| 4,218,772 | 8/1980 | Selman et al. | 455/20 |
| 4,231,116 | 10/1980 | Sekiguchi et al. | 370/30 |
| 4,242,542 | 2/1980 | Kimbrough | 455/20 |
| 4,451,699 | 5/1984 | Gruemberg | 455/20 |
| 4,485,486 | 11/1984 | Webb et al. | 455/33 |
| 4,556,760 | 12/1985 | Goldman | 455/33 |
| 4,613,990 | 9/1986 | Halpern | 455/33 |
| 4,704,733 | 11/1987 | Kawano | 455/33 |
| 4,754,495 | 6/1988 | Kawano et al. | 455/33 |

OTHER PUBLICATIONS

"Cell Enhancer", Edwin Quinn, 1982 IEEE, pp. 77–79.

Primary Examiner—Douglas W. Olms
Assistant Examiner—Curtis A. Kuntz
Attorney, Agent, or Firm—Fish & Richardson

[57] ABSTRACT

For use in a cellular radio-telephone system to enhance a signal from a cell site in an area shadowed by an obstruction such as a building or a mountain or the like, and to receive signals from subscribers in such areas, a cell enhancer includes bidirectional receivers, transmitters and amplifiers, the receivers and transmitters both including duplexer circuits for coupling signals in the proper up-link and down-link bands to the proper up-link and down-link antennas for transmission. Two embodiments of amplifiers are disclosed. A wideband amplifier network includes an input duplexer, a wideband amplifier with an attenuator, and an output duplexer, the duplexers coupling signals from both the up-link and down-link duplexer circuits to the amplifier for amplification. A narrow band network includes a plurality of amplifier modules each of which amplify only on one up-link and down-link channel assigned to the cell. A signal divider couples signals in the appropriate channels to the inputs of the corresponding modules, and a signal combining circuit receives signals from the modules to generate a composite signal for transmission by the up-link and down-link antennas. The enhancer further includes a control circuit responsive to signals from the cell site received through the amplifier for controlling the operations of the enhancer and for reporting to the cell site the status of the enhancer by transmitting signals through the enhancer.

13 Claims, 2 Drawing Sheets

CELLULAR RADIO TELEPHONE ENHANCEMENT CIRCUIT

BACKGROUND OF THE INVENTION

1. Field of the Invention

The invention relates generally to the field of amplifying devices for radio-frequency signals, and more specifically to amplifying systems for eliminating or overcoming dead spots in cellular radio-telephone systems caused by obstructions such as buildings or hills that block cellular radio-telephone signals in at least some portions of a cell.

2. Description of the Prior Art

Cellular radio-telephone systems have recently been introduced in a number of areas to provide telephone coverage for people who need to have access to telephones for communications, but who must be outside of their offices for long periods of time and are otherwise unable to get to telephones that are hard-wired to a central office over conventional telephone lines. Users of cellular systems may include, for example, people of any of a number of occupations, such as salesmen, repairmen, or pick-up or delivery men, who must do considerable amounts of automobile travel and who may not be near a telephone when their supervisors or dispatchers may need to communicate with them.

In the past, radio telephone systems have provided limited and expensive service to a number of areas. In prior systems, a radio signal from a single high-power transmitter covered an entire area. The number of subscribers who could use the system at any one time was limited by the number of channels provided for radio telephone service, which in turn was governed by the amount of radio frequency spectrum allocated to radio telephone usage in the area and the bandwidth of each channel. In most prior radio telephone systems, the number of channels, and thus the number of subscribers in a region who could use the system at any one time, was also small.

In cellular radio-telephone services, however, an area is divided into a plurality of small regions, or "cells", covered by a low-power transmitter. Currently, cellular radio telephone is provided in the 825 to 845 MHz and 870 to 890 MHz frequency bands. The higher frequency band is used for down-link transmissions, that is, transmissions from the "cell site" for reception by the subscriber. The "cell site" is the location of the transmitter, or, more specifically, the location of the antenna from which transmissions are effected for the cell. The lower frequency band is used for up-link transmissions, that is, transmissions from the subscriber for reception by the receiving equipment which is also located at the cell site.

Each of the frequency bands allocated to cellular radio telephone services in an area is divided into two parts, with one half being reserved for the local landline telephone company and the other half being franchised to a competing service provider. Each channel has a thirty kilohertz bandwidth, allowing for 666 channels in the twenty megahertz bands, with 333 being provided to the telephone company and the same number to the franchisee.

To avoid interference between transmissions in adjacent cells, the entire twenty megahertz bandwidth is not available in all of the cells. Instead, cells are assigned certain of the channels, such that adjacent cells are not assigned the same channels. Typically, the cells may be arranged so that each cell is surrounded by six others, and so each cell may have, for example, forty eight channels provided by each of the telephone company and a franchisee (that is 333 channels divided by seven). The actual topography of the cells and number of channels in the various cells may vary depending on a number of factors. As subscribers travel between cells, the channels in which they transmit and receive the telephonic voice signals are changed in a manner and by circuitry known in the art. Thus, ninety-six simultaneous calls can take place in each cell, one over each of the channels. Using prior radio-telephone arrangements with the same bandwidth signals and bands, only ninety-six calls could take place in an entire area.

However, since the cellular radio telephone service uses relatively low power and since the wavelengths of the signals is short, obstructions such as buildings and mountains which may be present between the cell site and a subscriber at various locations in a cell, can cause significant degradation in the signal levels, in some areas reducing them to unusable levels. Increasing the power of the signals may raise them to levels which are acceptable in those areas, but that could cause several problems. First, while adjacent cells do not use the same channels, at least some of the next closest cells will use the same channels, and raising power in some cells may cause interference in those other cells. Furthermore, raising the power of a signal in one channel may cause interference between adjacent channels in adjacent cells.

In any event, increasing power of the signal transmitted from a cell site will not enhance the signal the cell site receives from the subscriber. Indeed, since the subscriber can be anywhere in the cell, even near the cell's periphery, the amount of power that a subscriber can transmit is limited at least by the criterion that the subscriber's signal also cannot interfere with signals in nearby cells. Since a subscriber, when at the cell periphery, will be closer to nearby cells than is the cell site, the limitations on signal power of a signal from a subscriber are more pronounced than on signals from the cell site.

In some circumstances, automatic gain control circuits can be used to compensate for variations in the strength of received signals, but such circuits also tend to amplify noise, which can result in a very noisy audio signal if the received signal is significantly degraded. Furthermore, if the signal is too weak to be detected, the system may determine that the call has terminated and disconnect the other party or signal an error condition. Since this may occur numerous times as a subscriber travels throughout a cell, it is desirable to enhance the signal level and also signal reception by cell equipment in areas of a cell which may otherwise be subject to obstruction.

SUMMARY OF THE INVENTION

The invention provides apparatus for enhancing the level of a signal from a cell site in a cellular radio telephone system in areas in which obstructions otherwise reduce the signal levels, and also for enhancing the ability of the cellular system to receive signals from a subscriber in those areas.

In brief summary, the apparatus includes an "upstream" antenna system directed to the cell site for receiving the transmitted signal from the cell site and transmitting an amplified signal from a subscriber in the area of the cell otherwise obstructed to the cell site. A "downstream" antenna system is directed at the obstructed area of the cell for radiating an amplified signal from the cell site and for receiving signals from subscribers in the obstructed area. An amplifier system amplifies all of the signals received at each antenna system for radiation through the other antenna system. A supervisory system receives instructions from the cell site by way of the amplifier system to supervise operations of the apparatus and report results of tests and other status information to the cell site.

In one embodiment, the amplifier system comprises a single wideband amplifier path which amplifies all signals in both the up- and down-link bands allocated to the telephone company or the franchisee. Each antenna system is connected to a duplexer, which couples signals from the antenna system, which are to be amplified and transmitted through the other antenna system, to the input of the amplifier path. The duplexers also receive the amplified signals from the amplifier path and couple them to the antenna system for radiation to the cell site or the obstructed area. The amplifier path includes an input duplexer, which receives input signals from both antenna systems, a preamplifier, attenuator and power amplifer which couples an amplified signal to an output duplexer, which in turn couples the signals in the proper band to the respective antenna system.

In a second embodiment, the amplifier system just amplifies signals in the particular channels assigned to the cell. The amplifier system includes a plurality of bi-directional amplifier modules operational when the particular channel is being used. Each amplifier module heterodynes the received signals to selected intermediate frequencies for amplification. Band pass filters ensure that only signals for the required channel are amplified. The signals are heterodyned to the correct frequency for transmission through the proper antenna system.

In both embodiments, a supervisory system, under remote control of the cell site, receives commands from the cell site through the apparatus' amplifier path, supervises the performance and operational functions of the apparatus, and transmits status information to the cell site also through the apparatus' amplifer path.

BRIEF DESCRIPTION OF THE DRAWINGS

The invention is pointed out with particularity in the appended claims. The above and further advantages of the invention will be better understood by referring to the following detailed description of an illustrative embodiment taken in conjunction with the accompanying drawings, in which:

FIG. 1, comprising

DETAILED DESCRIPTION OF AN ILLUSTRATIVE EMBODIMENT

Figure 1A:
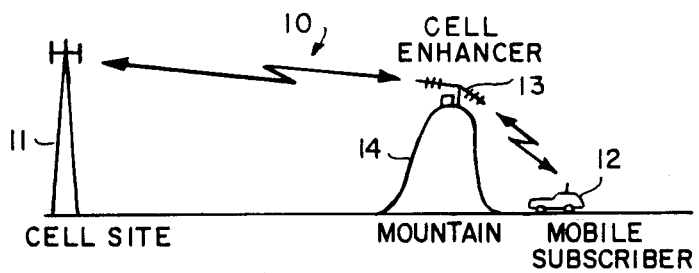
FIGS. 1A and 1B, is a diagram illustrating the various elements of a cell in a cellular radio telephone system including the instant invention.

With reference to FIG. 1A, a cellular radio telephone system 10 including the invention includes a "cell site" 11 represented by an antenna. Associated with the cell site is electronic equipment for receiving from a telephony network (not shown) voice signals and for generating radio frequency signals modulated thereby for transmission over the antenna. The radio frequency signals may be received by a subscriber 12 and demodulated to obtain the audio signals. The cell site 11 also has associated with it equipment for receiving, through the antenna, radio frequency signals modulated by voice signals originating from subscriber 12 and for transferring the voice signals to the telephony network. System 10 further includes a cell enhancer apparatus 13 for enhancing the operation of the system 10 in the presence of an obstruction such as mountain 14 between the subscriber 12 and cell site 11.

Figure 1B:
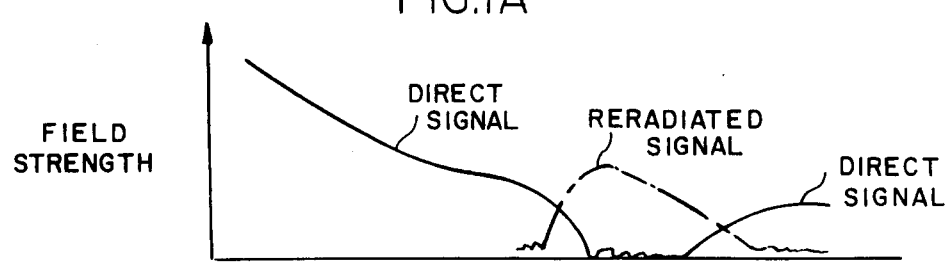

As illustrated in FIG. 1B, the strength of a signal radiated by the antenna at cell site 11 normally drops off as a function of the distance from the site. The degree by which the signal drops off depends on a number of criteria, including primarily the kind of signal pattern characteristic of the antenna at the cell site. However, an obstruction in the signal path, such as mountain 14, can cause a shadow to appear in the direct signal, where the signal strength drops to a very low level, immediately behind the obstruction (to the right of mountain 14 as shown in FIGS. 1A and 1B). A distance beyond this area, the signal level of the direct signal from the cell site increases again in the penumbra of the shadow caused by the mountain. Further away, the signal strength of the direct signal again falls off as it would in the absence of an obstruction.

Not shown in FIG. 1B, but as would be apparent to one skilled in the art, a signal from the subscriber 12 when in the shadow of the mountain 10 would also have a significantly reduced signal strength in the region of the cell to the left of the mountain 14 (as shown in FIG. 1A).

Figure 2:
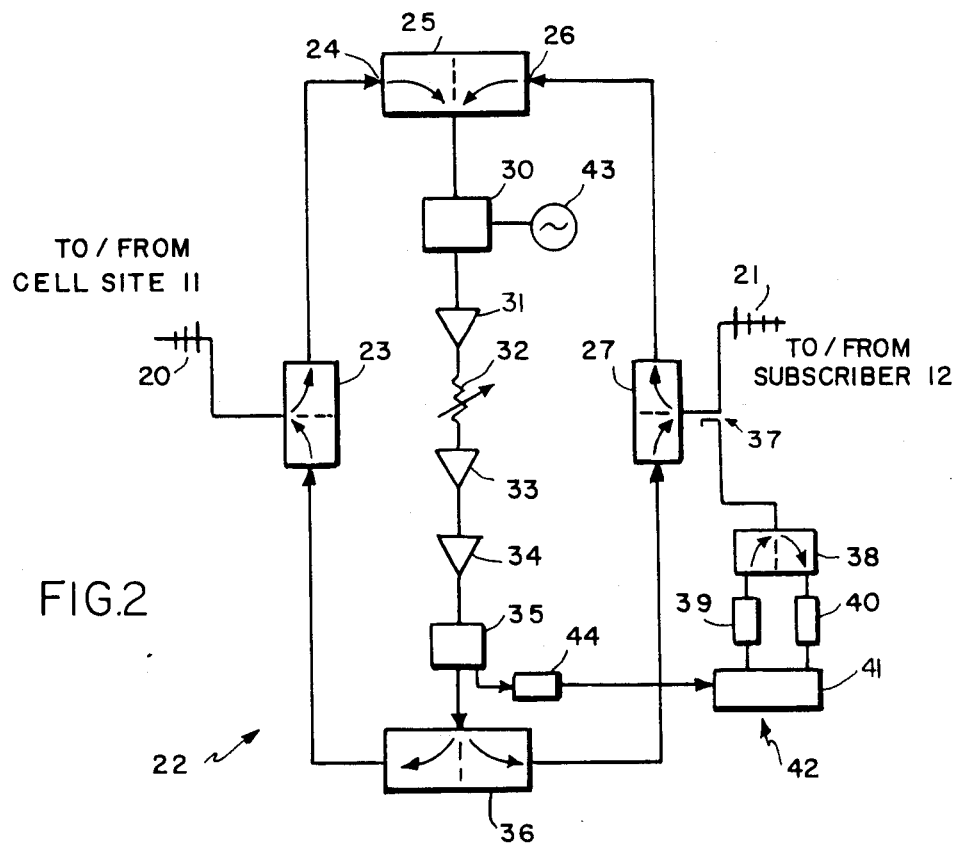
FIG. 2 is a block diagram of one embodiment of the invention.

The cell enhancer provides an increase in the field strength of a signal from the cell site by re-radiating the signal from the cell site 11 into the area of the shadow caused by mountain 14. In addition, cell enhancer 13 also received signals from the subscribers, such as subscriber 12, in the shadow area and transmits them to cell site 11. With reference to FIG. 2, one embodiment of a cell enhancer includes an antenna system 20 which is directed at the cell site 11, a second antenna system 21 which is directed at the shadow region, and a bidirectional amplifier 22 which receives the signals from the cell site 11 by way of antenna system 11, amplifies them, and transmits them into the shadow region through antenna system 21. In addition, the amplifier 22 receives signals from subscribers 12 in the shadow region through antenna system 21, amplifies them, and transmits them to the cell site through antenna system 20. In the cell enhancer embodiment depicted in FIG. 2, the amplifier 22 is a single wideband amplifier that is capable of amplifying all frequencies in the two ten-megahertz radio frequency bands, one band being for transmissions from the cell site to the subscribers and the other band being for transmissions from the subscribers to the cell site, that are allocated to the franchisee or the telephone company in the area. A duplexer 23 connected to antenna system 20 receives radio frequency signals from the antenna system and passes those in the appropriate 870 to 880 or 880 to 890 megahertz band to an input terminal 24 of a second duplexer 25. Duplexer 24 also has a second input terminal 26, which receives radio frequency signals from another duplexer 27, in one of the bands 825 to 835 or 835 to 845 megahertz, from antenna system 21 originating at a subscriber 12.

Duplexer 24 couples the radio frequency signals in the selected bands from both duplexers 23 and 27 to an input terminal of a directional coupler 30 which, in turn, couples the signals to the input terminal of a low-noise preamplifier 31. The signal amplified by preamplifer 31 is then coupled through an attenuator 32 and buffer amplifier 33 to the input terminal of a power amplifier 34. After being amplified by the power amplifier, the signal is coupled through a second directional coupler 36 to the input terminal of another duplexer 36. Duplexer 35 receives the signal from directional coupler 36 and couples the portion of the signal in the 825 to 835 or 835 to 845 megahertz band to an input terminal of duplexer 23, which couples the signal to antenna system 20 for transmission to the cell site. The duplexer 36 also couples the portion of the signal from directional coupler 35 that is in the 870 to 880 or 880 to 890 megahertz band to an input terminal of duplexer 27, which couples the signal to antenna system 21 for transmission into the shadow area.

The cell enhancer depicted in FIG. 2 further includes a control circuit 42 which comprises a directional coupler 37 which couples the signal from antenna system 21 to a duplexer 38. Duplexer 38 in turn couples the signal to a receiver 40. Receiver 40 receives a radio-frequency signal in the down-link band which originated at the cell site 11 containing digital control and supervisory information, which, in turn, is transferred to a microprocessor controller 41. The controller 41 may, for example, control the amount of attenuation provided by attenuator 32, and may also transmit status information through a transmitter 39. The transmitter generates radio-frequency signals in the up-link band that are coupled through duplexer 38 and coupler 37 to antenna system 21. The signals are then transferred through enhancer 22 as up-link signals and are received and processed by the cell site.

In addition, the cell enhancer 22 includes a signal generator 43 that generates a radio-frequency signal having a selected amplitude outside of both the up-link band and the down-link band, and a receiver 44. The signal generator couples the signal to the directional coupler 30. The signal from the signal generator 43 is amplified by amplifiers 31, 33 and 34 and coupled by the directional coupler 35 to receiver 44. Receiver 44, in turn, determines the, for example, peak-to-peak amplitude of the signal from signal generator 44 and transmits the information to controller 41. Since the amplitude of the signal from generator 43 is pre-selected, the amplitude information from receiver 44 indicates the gain of the circuit comprising amplifiers 31, 33 and 34 and attenuator 32. The controller 32 may transmit the gain information back to the cell site, or alternatively or additionally adjust the level of attenuator 32.

It will also be appreciated that the amplitude of the signal transmitted by cell enhancer 13 into the shadow area must be carefully selected based on the location of the enhancer in the cell, and specifically based on its proximity to the cell periphery, to minimize interference with signals in adjacent cells. The power level of the down-link signals that are transmitted from the cell site 11 into the shadow region may be adjusted by adjusting the attenuator 32 to provide an appropriate input signal level to buffer amplifier 33.

Similarly, the cell enhancer should be adjusted so that the signals that are transmitted to the cell site 11 preferably include only the signals from the subscribers in the corresponding cell. If the cell enhancer's attenuator is adjusted to too high a level, the enhancer may pick up and transmit a significant number of signals from other cells, which wastes power and also may result in cross-s-channel interference. The adjustment of attenuator 32 may also be used so as to minimize amplification of signals from other cells.

Figure 3:
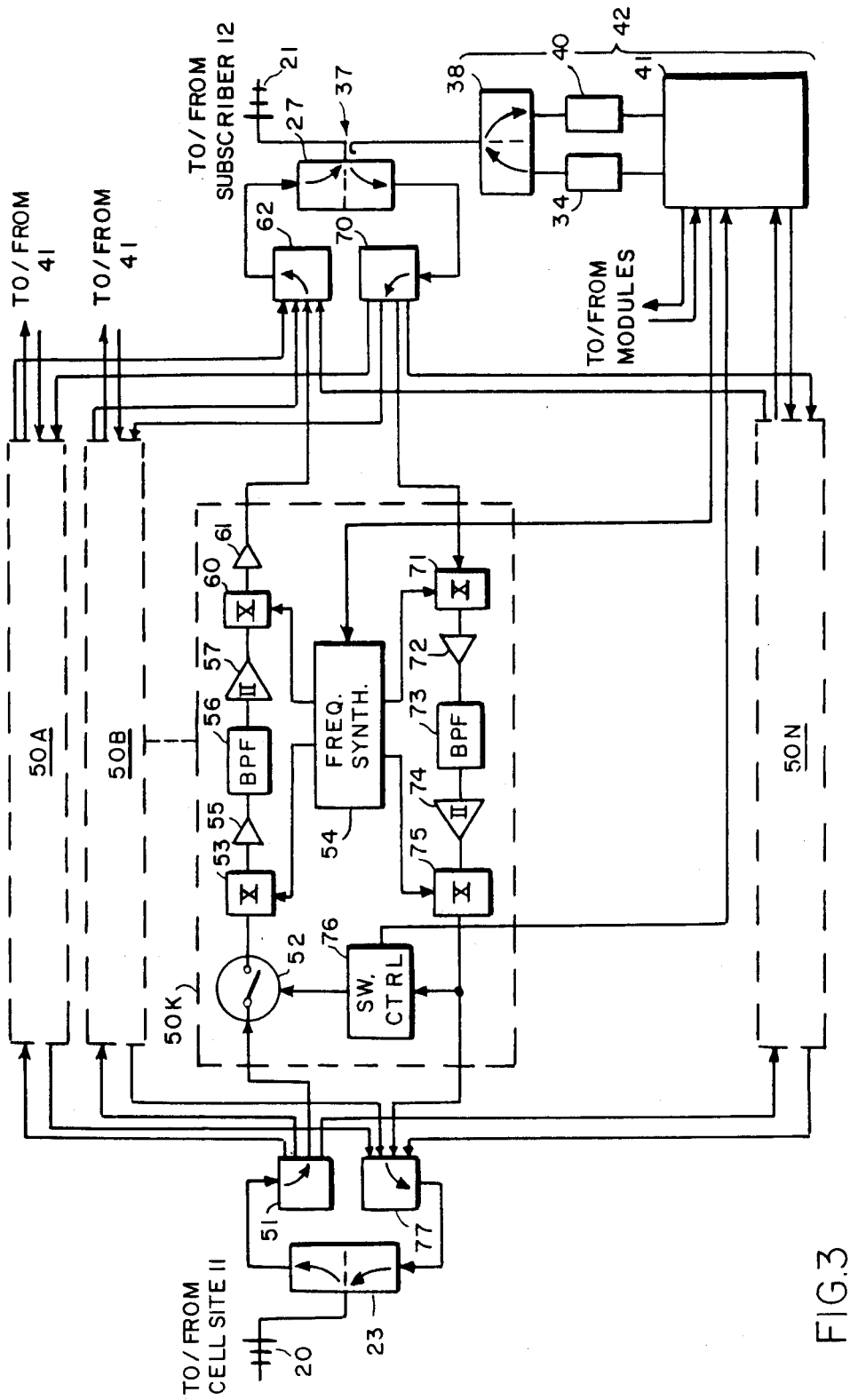
FIG. 3 is a block diagram of a second embodiment of the invention.

With reference to FIG. 3, a second embodiment of a cell enhancer 13 includes a plurality of bidirectional amplification modules 50a through 50n each of which amplifies signals associated with a single thirty kilohertz channel, rather than the entire ten megahertz bandwidth of signals that is allocated to cellular radio-telephone service provider, thus minimizing the cross-channel interference problems that may inhere in the embodiment depicted in FIG. 2. Since each of the modules is identical, except for the details of the modules relating to its associated frequencies, only one module 50k will be described in detail.

As in the embodiment depicted in FIG. 2, the cell enhancer includes an antenna system 20 for receiving signals from and transmitting signals to a cell site 11 and an antenna system 21 for receiving signals from and transmitting signals to subscribers 12 in the shadow region. Antenna system 20 delivers signals in the appropriate 870 to 880 or 880 to 890 megahertz band to an input terminal of a divider 51. The divider has an output terminal connected to an input terminal of each module 50a through 50n, through which it couples the signal in one of the channels to the input terminal, and specifically to a switch 52. If switch 52 is closed, the signal is coupled to the module's down-link amplifying circuit, and specifically to the input terminal of a mixer 53 which also receives a signal from a frequency synthesizer 54. The mixer heterodynes the signals from the switch 52 and synthesizer 54 to produce an intermediate signal, which in one embodiment is centered on forty-five megahertz, at its output terminal.

The signal at the output terminal of mixer 53 is coupled through a buffer amplifier 55 to the input terminal of a band pass filter 56, whose band pass in the mentioned embodiment is centered on forty-five megahertz. The output signal from the band pass filter is coupled to another amplifier 57, which amplifies with hysteresis to minimize noise in the signal. The output signal from amplifier 57 is then coupled to a second mixer 60, which receives a signal from the frequency synthesizer 54 of the same frequency as was coupled to mixer 53, and which produces a radio-frequency signal of the same frequency as was provided at the input terminal to the module. The output signal from mixer 60 is coupled to an output amplifier 61, which provides an amplified signal at the output terminal of the module.

All of the output signals from the output terminals of modules 50a through 50n are coupled to a signal combiner 62, which combines the signals on the separate lines and couples a single signal to an input terminal of duplexer 27 for transmission through antenna system 21 to subscribers 12 in the shadow region.

A signal from a subscriber 12 in the shadow region is received by antenna system 21 and coupled by duplexer 27 to the input of a signal divider 70, which operates in the same manner as divider 57 to couple signals in the various channels to input terminals of the various modules 50a through 50n for receiving up-link signals from the subscribers. In module 50k, the signal from the divider 70 is coupled directly to an up-link amplifying circuit that is similar to the down-link amplifying circuit.

Specifically, the signal from the signal divider 70 is coupled to the input terminal of a mixer 71 which receives a signal from the frequency synthesizer 54 and, in a known manner, produces a signal centered on, in the one embodiment, forty-five megahertz. The signal produced by mixer 71 is amplified by amplifier 72, and the amplified signal is coupled to the input terminal of a band pass filter 73. The filtered signal is then coupled to an amplifier 74, which amplifies with hysteresis, and the amplified signal is coupled to a second mixer 75. Mixer 75 provides an output signal in the appropriate channel frequency to a signal combiner 77, which operates in a manner similar to combiner 62, to receive up-link signals on separate lines from all of modules 50a through 50n and combine them for transmission on a single output line to an input of duplexer 23 for transmission by antenna system 20 to cell site 11.

The output of mixer 75 is also sensed by a switch control circuit 76. If a signal is sensed, indicating that a subscriber is using the channel, the switch control 76 closes switch 52 to enable to down-link amplifying circuit to amplify signals from the divider. Otherwise, if the channel is not being used, the switch 52 is open and the down-link circuit is in an idle condition, to reduce power consumption.

It will be appreciated that the intermediate frequencies selected may differ from the forty-five megahertz frequency used in the described embodiment.

The cell enhancer depicted in FIG. 3 also includes a control circuit 42 which is similar to the control circuit depicted in FIG. 2 and which performs similar operations. Although not shown in FIG. 3, the cell enhancer may also include a signal generator and receiver similar to generator 43 and receiver 44 (FIG. 2) which, under control of controller 41, may be connected to appropriate points in modules 50a through 50n to determine their gain and operational status. In addition, the control circuit 42 of FIG. 3 may also be used to perform other tasks appropriate to the illustrated embodiment, including adjusting the frequencies of the signals provided by the frequency synthesizer in response to commands from the cell site or in response to switch control 76 indicating receipt of an up-link signal from a subscriber while scanning the channels associated with the cell. The scanning operation can be performed by the control circuit 42 adjusting the frequency of the signals from synthesizer 54 to mixers 71 and 75. This would allow the various modules 50a through 50n to selectively respond to a number of channels, thereby having increased flexibility, as a limited number of modules could be included in a cell enhancer to cover a cell having a larger number of channels. The number of modules in a cell enhancer could then be based on the amount of call traffic in the cell.

The foregoing description is limited to a specific embodiment of this invention. It will be apparent, however, that this invention can be practiced in systems having diverse basic construction or that use different internal circuitry than is described in the specification with some or all of the foregoing advantages. Therefore, it is the object of the appended claims to cover all such variations and modifications which come within the true spirit and scope of this invention.

What is claimed as new and desired to be secured by Letters Patent of the United States is:

1. For use in a cellular radio telephone system, a cell enhancer for amplifying duplex communications between a cell site and a subscriber in a selected region of a cell over a plurality of radio frequency channels comprising:

A. cell site communications means for receiving signals from and transmitting signals to the cell site over the plurality of radio frequency channels, comprising:
  i. cell site antenna means for converting signals between electromagnetic signals from the cell site or the subscriber and electrical signals;
  ii. cell site duplexer means for receiving the electrical signals from the cell site antenna means and directing them to a cell site duplexer output node and for receiving amplified output signals from a cell site duplexer input node for directing them to said antenna means for conversion to electromagnetic signals for transmission to the cell site;
  iii. cell site signal divider means connected to said cell site duplexer output node for receiving the electrical signal from said cell site duplexer output node for coupling cell site channel signals in respective cell site channels to respective cell site signal channel output nodes;
  iv. cell site signal combiner means connected to a plurality of cell site signal channel input nodes for receiving cell site channel signals in respective cell site channels and combining them to form a cell site composite signal and coupling it to said duplexer input node;
B. subscriber communications means for receiving signals from and transmitting signals into the selected region of the cell over the plurality of radio frequency channels, comprising:
  i. subscriber antenna means for converting signals between electromagnetic signals from the subscriber and electrical signals;
  ii. subscriber duplex means for receiving the electrical signals from the subscriber antenna means and directing them to a subscriber input node and for receiving amplified output signals to be transmitted into said selected region of said cell from a subscriber output node and for directing them to said antenna means for conversion to electromagnetic signals for transmission to the subscriber;
  iii. subscriber signal divider means connected to said subscriber duplexer output node for receiving the electrical signal from said subscriber duplexer output node for coupling subscriber channel signals in respective subscriber channels to respective subscriber signal channel output nodes;
  iv. subscriber signal combiner means connected to a plurality of subscriber signal channel input nodes for receiving subscriber channel signals in respective subscriber channels and combining them to form a subscriber composite signal and coupling it to said duplexer input node;
C. duplex amplification means including a plurality of duplex amplification module means for (i) receiving a channel signal from one of said cell site signal channel output nodes, amplifying it and coupling the amplified channel signal to the subscriber channel input node for transmission by said subscriber communications means to said subscriber, and (ii) for receiving a channel signal from one of said subscriber signal channel output nodes amplifying it and coupling the amplified channel signal to the cell site channel input node for transmission by said cell site communications means to said cell site; and D. control means connected to one of said communications means and said duplex amplification means for controlling the operation of said duplex amplification means.

2. A cell enhancer as claimed in claim 1 further comprising amplification means connected between the output of said combining means and the input of each said duplexer means to amplify the signal coupled to the respective duplexer means.

3. A cell as claimed in claim 1 wherein each duplex amplification module means comprises:
   A. frequency synthesizing means for generating signals of selected frequencies; and
   B. up-link amplification means and down-link amplification means each connected to a respective output of a signal divider means and an input of a signal combining means including:
      i. intermediate frequency signals generating means connected to said frequency synthesizing means and to the respective output of a signal divider means for generating an intermediate frequency signal in response to the signal from the connected signal divider means and from said frequency synthesizing means;
      ii. intermediate signal amplification means connected to the output of said intermediate frequency signal generating means for amplifying said intermediate signal; and
      iii. radio frequency signal generating means connected to the output of said intermediate signal amplification means, said frequency synthesizing means and a signal combining means for generating an output signal for transmission to the connected signal combining means in response to the signal from said intermediate signal amplification means and said frequency synthesizing means.

4. A cell enhancer as claimed in claim 3 wherein said up-link and down-link amplification means further comprise bandpass filter means connected to the output of said intermediate signal generating means and the input of said intermediate signal amplification means for performing a filtering operation on the intermediate frequency signal, said bandpass filter means having input buffer amplifier means for buffering the signal from said intermediate signal generating means before performing the filtering operation.

5. A cell enhancer as defined in claim 4 wherein said intermediate signal amplification means comprises a nonlinear amplifier.

6. A cell enhancer as defined in claim 3 wherein a duplex amplification module means further comprises switch means connected between the input of the down-link amplification means and the output of the respective signal divider means, said switch means having control input terminal, and switch control means connected to the output of the duplex amplification module means up-link amplification means for enabling said switch means to close to couple a signal from the signal divider means in response to a signal being present in the up-link amplification means, and otherwise being open.

7. A cell enhancer as defined in claim 6 wherein said controller means comprises:
   A. coupler means for coupling radio frequency signals from and to one of said communications means;
   B. receiving means connected to said coupler means for generating digital output signals in response to said radio frequency signals from said communications means;
   C. micro-processor controlled circuit means for processing the digital output signals from said receiving means and for generating digital output signals for transmission to said cell site; and
   D. transmitting means connected to said coupler means and said micro-processor controlled circuit means for receiving the digital output signals generated by said micro-processor controlled circuit means and for generating radio-frequency signals in response thereto for transmission to said coupler means.

8. A cell enhancer as claimed in claim 7 wherein said micro-processor controlled circuit means is connected to said frequency synthesizing means in each module means for controlling the frequencies of the signals generated by said frequency synthesizing means.

9. A cell enhancer as claimed in claim 8 further comprising signal generating means for generating a test signal having a selected frequency and a predetermined amplitude, detector means for detecting said test signal and in response thereto generating an amplitude value in response to the amplitude of the signal at the detector means, means responsive to said controller means for selectively connecting said generating means and detector means to selected ones of said amplification means, the amplitude value generated by said detector means being a function of the gain of the selected amplification means, said detector means being further connected to said controller means for transmitting said amplitude value to said controller means.

10. For use in a cellular radio telephone system, a cell enhancer for amplifying duplex communications between a cell site and a subscriber in a selected region of a cell over a plurality of radio frequency channels comprising:
   A. cell site communications means for receiving signals from and transmitting signals to the cell site over the plurality of radio frequency channels, comprising:
      i. cell site antenna means for converting signals between electromagnetic signals from the cell site or the subscriber and electrical signals;
      ii. cell site duplex means for receiving the electrical signals from the antenna means and directing them to cell site input node and for receiving amplified output signals from a cell site output node for directing them to said antenna means for conversion to electromagnetic signals for transmission to the cell site;
   B. subscriber communications means for receiving signals from and transmitting signals into the selected region of the cell over the plurality of radio frequency channels, comprising:
      i. subscriber antenna means for converting signals between electromagnetic signals from the subscriber and electrical signals
      ii. subscriber duplex means for receiving the electrical signals from the subscriber antenna means and directing them to a subscriber input node and for receiving amplified output signals to be transmitted into said selected region of said cell from a subscriber output node and for directing them to said antenna means for conversion to electromagnetic signals for transmission to the subscriber;
   C. duplex amplification means comprising:

i. duplex input means connected to both said cell site input node and said subscriber input node for receiving input signals from both said cell site input node and said subscriber input node and generating in response thereto a combined input signal;

ii. duplex output means connected to said cell site output node and said subscriber output node for receiving a combined amplified output signal and generating in response thereto a cell site amplified output signal coupled to the respective cell site output node and a subscriber amplified output signal coupled to said subscriber output node; and iii. wide band amplification means having an input connected to said duplex means and an output connected to said duplex output means for generating said combined amplified output signal in response to the combined input signal received from said duplex input means; and D. control means connected to one of said communications means and said duplex amplification means for controlling the operation of said duplex amplification means.

11. A cell enhancer as defined in claim 11 wherein said wideband amplification means includes:

a. preamplification means having an input connected to receive signals from said duplex input means and an output for amplifying the signal from said duplex input means;

b. adjustable attenuation means connected to said preamplification means for attenuating the signal therefrom; and c. power amplifier means connected to said attenuation means for amplifying the signal therefrom and coupling the amplified signal to the duplex output means.

12. A cell enhancer as defined in claim 12 wherein said controller means comprises:

A. coupler means for coupling radio frequency signals from and to one of said communications means;

B. receiving means connected to said coupler means for generating digital output signals in response to said radio frequency signals from said communications means;

C. micro-processor controlled circuit means for processing the digital output signals from said receiving means and for generating digital output signals for transmission to said cell site; and D. transmitting means connected to said coupler means and said micro-processor controlled circuit means for receiving the digital output signals generated by said micro-processor controlled circuit means and for generating radio-frequency signals in response thereto for transmission to said coupler means.

13. A cell enhancer as claimed in claim 12 further comprising signal generating means for generating a test signal having a selected frequency and a predetermined amplitude, detector means for detecting said test signal and in response thereto generating an amplitude value in response to the amplitude of the signal at the detector means, means responsive to said controller means for selectively connecting said generating means and detector means to selected ones of said amplification means, the amplitude value generated by said detector means being a function of the gain of the selected amplification means, said detector means being further connected to said controller means for transmitting said amplitude value to said controller means.

* * * * *